United States Patent

[11] 3,588,649

| [72] | Inventors | Gunter Heine;<br>Carsten Droge, Lahr; Joseph Ludemann, Oldenburg; Ingo Koch, Tungeln; Elimar Christoffers, Oldenburg, Germany |
|---|---|---|
| [21] | Appl. No. | 798,326 |
| [22] | Filed | Feb. 11, 1969 |
| [45] | Patented | June 28, 1971 |
| [73] | Assignee | Licentia Patent-Verwaltungs-G.m.b.H.<br>Frankfurt am Main, Germany |
| [32] | Priority | Feb. 14, 1968 |
| [33] | | Germany |
| [31] | | P 16 38 440.0 |

[54] SPEED-CONTROLLABLE CAPACITOR MOTOR
5 Claims, 4 Drawing Figs.

[52] U.S. Cl............................................ 318/224,
318/225, 318/226
[51] Int. Cl............................................... H02k 17/06,
H02p 7/48
[50] Field of Search........................................... 318/220,
221, 224, 224.1, 225, 226

[56] References Cited
UNITED STATES PATENTS

| 1,859,368 | 5/1932 | Kennedy | 318/224 |
| 1,912,337 | 5/1933 | Kennedy | 318/224 |
| 2,890,938 | 1/1958 | Davies | 318/224 |
| 2,959,721 | 11/1960 | Butler et al. | 318/224 |
| 3,233,160 | 1/1966 | Rawcliffe | 318/224 |

Primary Examiner—Oris L. Rader
Assistant Examiner—Gene Z. Rubinson
Attorney—Spencer and Kaye ABSTRACT: A speed-controllable single-phase capacitor motor which is operable at two stable speeds that have a ratio, one to the other, of 3:1. The motor has three stator windings which are connectable in the Steinmetz delta configuration for operation at high speed and connectable in a configuration which forms an airgap flux having the zero-sequence system as symmetrical components for operation at low speed.

Inventors:
Günter Heine
Carsten Dröge
Joseph Ludemann
Ingo Koch
Elimar Christoffers By: Spencer & Kaye
Attorneys

3,588,649

SPEED-CONTROLLABLE CAPACITOR MOTOR

BACKGROUND OF THE INVENTION

The present invention relates to a speed-controllable capacitor motor having a squirrel-cage rotor and three stator windings normally connected in delta. This type of delta-connected stator in a capacitor motor is sometimes called the "Steinmetz delta" configuration.

Speed control of capacitor motors has been effected, in the prior art, by employing two independent windings with different numbers of poles. The so-called "Dahlander connection" has been used to obtain two speed steps having a ratio, one to the other, of 2:1. On the half-speed connection, it makes use of "consequent poles." Electric motors using this Dahlander connection are further described, for example in "THEORY AND DESIGN OF SMALL INDUCTION MOTORS" by C. G. Veinott: McGRAW-HILL BOOK COMPANY INC. (New York, Toronto, London; 1959) pp. 135—138. With two-speed tapped-winding capacitor motors, the parts of a single winding defined by winding taps are connected and disconnected, as required by a suitable switch. However, this technique of speed control results in speed steps having only a relatively small speed difference.

For certain applications it is desirable to employ speed-controllable motors having a speed ratio, between individual speed steps, of greater than 2:1. Such motors are particularly useful, for example, for the driving of circulating pumps for heating equipment.

SUMMARY OF THE INVENTION

It is an object of the present invention, therefore, to provide a speed-controllable single-phase capacitor motor having at least two speeds of speed ratio greater than 2:1.

This object, as well as other objects which will become apparent in the discussion that follows, is achieved, according to the present invention, by providing a single phase capacitor motor of the type having a squirrel-cage rotor and three stator windings, with a suitable switching means for selectively connecting the stator windings either in a first configuration in which the motor operates at a first speed or in a second configuration in which the motor operates at a second speed, the first speed having a speed ratio with respect to the second speed of approximately 3:1.

More particularly, the switching means is arranged to connect the three windings into the so-called "Steinmetz delta circuit" when in the first configuration and to connect the windings, when in the second, to produce an effective airgap flux having symmetrical components which include the zero-sequence system. For a discussion of the analytical procedure known as the "method of symmetrical components" see Electric Circuits, by Members of the Staff of the Department of Electrical Engineering, Massachusetts Institute of Technology; John Wiley and Sons, (New York; 1944) pp. 526, 527 and 578—587.

According to a preferred embodiment of the present invention the three stator windings are connected in series across the input line voltage terminals when in the second winding configuration. When so connected, the capacitor motor exhibits a torque characteristic similar to a motor with a single stator winding wound with three times as many pairs of poles. When switched from the first, or Steinmetz delta winding configuration to this second, or series configuration the speed of the motor will fall to approximately one-third of its previous speed. Although the breakdown, or maximum torque of the motor at this lower speed stage of operation will be considerably less than that at the higher speed, this torque will be fully adequate if the motor is employed to drive a centrifugal pump or a blower since the load-torque applied by these devices falls approximately quadratically with speed.

If it is desired to have the motor develop a starting torque when initially switched on in the second winding configuration (i.e., at the slower speed stage), the windings should be connected according to a second preferred embodiment of the present invention wherein only two of the three stator windings are connected in series across the input line voltage terminals. This may be accomplished in a practical way, according to the present invention, by providing switching means for selectively removing that stator winding which, when the windings are connected in the first, or Steinmetz delta configuration, is directly connected across the line voltage terminals.

When the windings are connected according to this second preferred embodiment, the motor will exhibit a torque characteristic formed by the superposition of the torques produced by a weak residual fundamental field and a zero-sequence field of three poles.

Since this torque characteristic has two maxima, it is possible that the motor will remain at the higher speed under certain load conditions when its windings are switched from the first (high speed) configuration to this second (low speed) configuration. Such conditions of light load torques can occur, for example, when the motor is employed to drive a water pump in a partly closed-off circulation system. In such cases it is advantageous, according to the present invention, to short circuit the winding which has been removed from the power circuit in the second winding configuration. This short-circuited winding will cause an additional speed-dependent negative torque component to be superimposed on the torque of the motor. At high motor speeds this additional component will have a sharp braking effect on the motor, while at lower speeds it will have but little influence at all.

DESCRIPTION OF THE PREFERRED EMBODIMENTS

Figure 1:
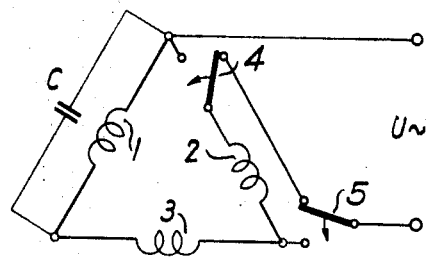
FIG. 1 is a schematic diagram of a stator winding and switching arrangement, according to a first preferred embodiment of the present invention. This arrangement, which utilizes the zero-sequence field, may be employed with a single-phase capacitor motor to provide two speeds having a ratio of approximately 3:1.
Figure 2:
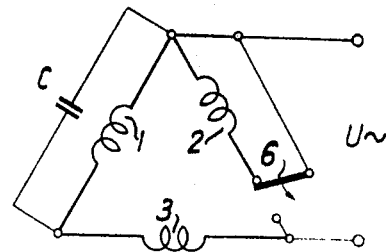
FIG. 2 is a schematic diagram of a stator winding and switching arrangement, according to a second preferred embodiment of the present invention. This arrangement, which utilizes the zero-sequence field, may be employed with a single-phase capacitor motor to provide two speeds having a ratio of approximately 3:1.

The preferred embodiments of the present invention will now be described in connection with FIGS. 1—4 of the drawings. FIGS. 1 and 2 thereof illustrate two preferred embodiments for the connection of three stator windings 1, 2 and 3 of a capacitor motor supplied by a single-phase AC voltage source U. The switches 4 and 5 of the embodiment of FIG. 1 and the switch 6 of the embodiment of FIG. 2 are in the positions appropriate to operate the motor at the lower speed. When the switches 4 and 5 of FIG. 1 and the switch 6 of FIG. 2 are switched in the direction indicated by the arrows, the stator windings will be connected to the line voltage terminals in the so-called Steinmetz delta configuration. When so connected, the capacitor motor will operate at its normal or high speed and produce the greatest torque.

When the windings are switched to the low-speed configuration in the embodiment of FIG. 1, practically only the zero-sequence system is effective to produce a torque, although this torque is assisted by a small fundamental field torque effected by the capacitor C. The resulting torque characteristic is shown as the curve 7 in FIG. 3. As may be seen, the low-speed winding configuration in the embodiment of FIG. 1 does not produce an independent starting torque.

With the circuit embodiment of FIG. 2, the winding 2, which is connected directly across the line voltage terminals when the three windings are connected in the Steinmetz delta configuration, can be disconnected from the line voltage terminals and, if necessary, short-circuited by the switch 6. When the winding 2 is short-circuited as shown in FIG. 2, the capacitor motor will have a torque characteristic illustrated as the curve 8 in FIG. 3. If the winding 2 is disconnected but not short-circuited, the motor will have the torque characteristic shown in FIG. 3 by the dotted-dashed line 9. This characteristic exhibits a positive torque region with a separate maximum at higher motor speeds. Under light load conditions, this second positive torque region would be effective to maintain the motor at high speed if it were initially brought up to speed by operation in the Steinmetz delta configuration.

Figure 3:
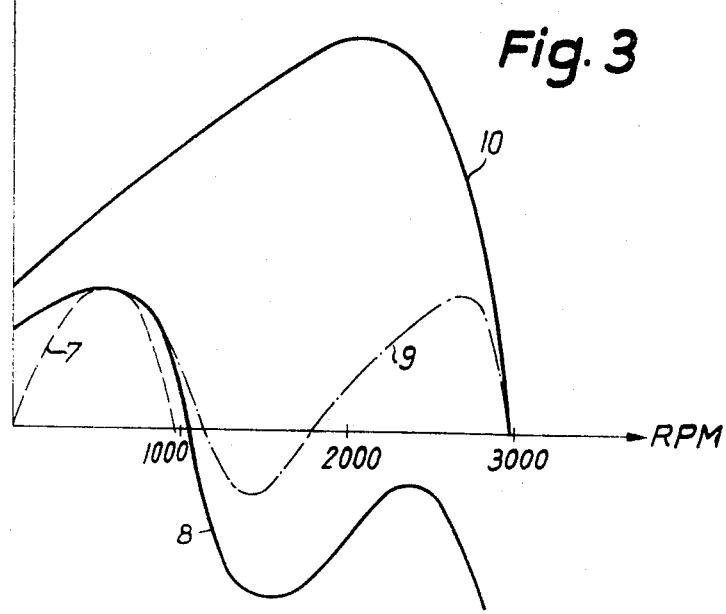
FIG. 3 shows the torque-speed characteristics of two single-phase capacitor motors provided with the stator winding and switching embodiments of FIGS. 1 and 2.

As may be seen from the curves 8 and 9 of FIG. 3, the stator winding embodiment of FIG. 2 will provide considerable starting torque when connected in the low-speed configuration.

When the stator winding of the capacitor motor according to the present invention—e.g. per the embodiments of FIGS. 1 and 2—are connected in the Steinmetz delta configuration, the motor will exhibit the torque speed characteristic illustrated by the curve 10 of FIG. 3.

If the capacitor motor according to the present invention is to be used to drive a centrifugal pump or a blower, it is possible to create an especially favorable match between the load conditions and the operating characteristics of the motor and to achieve approximately the same power losses in both of the motor speed stages by properly choosing the number of turns of the stator windings. In particular, the number of turns should be made sufficiently high so that, given a particular value for the operating capacitor, the no-load power losses of the windings when connected to operate the motor in the higher speed stage are greater than the minimum no-load power losses which would occur with a fewer number of turns. The only disadvantage of this constraint is that the motor will operate at something less than its full power capability in the higher speed stage.

When the stator windings and the speed-changing switch are connected according to the embodiment of FIG. 2, a power match may also be advantageously achieved by providing the removable stator winding 2 with a fewer number of turns than the windings 1 and 3. With this modification there will be practically no reduction in the power delivered by the motor when connected to operate at the higher speed.

Figure 4:
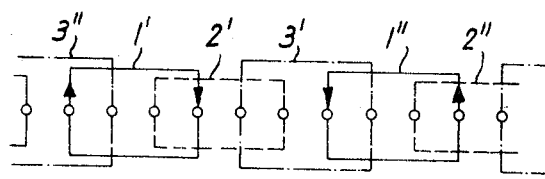
FIG. 4 is a schematic diagram of an especially advantageous winding arrangement for a capacitor motor having 12 slots.

FIG. 4 illustrates a preferred embodiment of the stator winding distribution of an exemplary 2-pole, 12-slot capacitor motor, according to the present invention, which is operable at two speeds having a ratio, one to the other, of 3:1. The stator windings can be connected, for example, according to either of the embodiments shown in FIGS. 1 and 2.

If each of the three stator windings is formed as two coils distributed in four slots spaced at equal distances around the inner circumference of the stator with the average pitch of each individual coil equal to one-half a pole pitch, the zero-sequence flux and, therefore, the generated torques will be especially large.

Accordingly, the motor embodiment of FIG. 4 is wound with the coils 1' and 1'' of the stator winding 1, the coils 2' and 2'' of the stator winding 2 and the coils 3' and 3'' of the stator winding 3. Each of the coils is short-pitched by one-half the pole pitch. The resulting winding distribution is the same as that employed in the well-known 2/4-pole speed-controllable motor that utilizes the Dahlander winding connection.

It will be understood that the above description of the present invention is susceptible to various modifications, changes and adaptations.

We claim:

1. In a speed-controllable single-phase capacitor motor having three stator windings, the improvement comprising switching means, connected to at least one of said stator windings for selectively connecting said stator windings either in a Steinmetz delta first configuration in which said motor operates at a first speed or in a second configuration that forms an effective airgap flux, the symmetrical components of which include the zero-sequence system, in which said motor operates at a second speed, said first speed having a speed ratio with respect to said second speed of approximately 3:1, said second winding configuration being the series connection of said three stator windings across the input line voltage terminals.

2. In a speed-controllable single-phase capacitor motor having three stator windings, the improvement comprising switching means, connected to at least one of said stator windings, for selectively connecting said stator windings either in a Steinmetz delta first configuration in which said motor operates at a first speed or in a second configuration that forms an effective airgap flux, the symmetrical components of which include the zero-sequence system, in which said motor operates at a second speed, said first speed having a speed-ratio with respect to said second speed of approximately 3:1, said second winding configuration being the series connection of two of said three stator windings across the input line voltage terminals, and the third of said stator windings being the stator winding which is connected directly across said input voltage terminals when said windings are connected in said first configuration.

3. The improvement defined in claim 2, wherein said one stator winding is short-circuited when said windings are connected in said second configuration.

4. The improvement defined in claim 2, wherein said stator windings are provided with at least that number of turns for a given capacitor value in which, when said stator windings are connected in said first configuration and said motor is operated at said first speed, the no-load power losses of said windings are greater than the lowest no-load power losses which would occur with a fewer number of turns.

5. The improvement defined in claim 2, wherein said one stator winding has a fewer number of turns than either of said two stator windings.